United States Patent [19]

Walsh et al.

[11] Patent Number: 5,774,727

[45] Date of Patent: Jun. 30, 1998

[54] PARALLEL PROCESSING SYSTEM FOR VIRTUAL PROCESSOR IMPLEMENTATION OF MACHINE-LANGUAGE INSTRUCTIONS

[75] Inventors: Robert J. Walsh, Hopkinton; Bradley Miller, Westboro, both of Mass.

[73] Assignee: Digital Equipment Corporation, Maynard, Mass.

[21] Appl. No.: 579,457

[22] Filed: Dec. 27, 1995

Related U.S. Application Data

[63] Continuation of Ser. No. 396,355, Feb. 28, 1995, abandoned, which is a continuation of Ser. No. 288,646, Aug. 10, 1994, which is a continuation of Ser. No. 722,072, Jun. 27, 1991, abandoned.

[51] Int. Cl.$^6$ .............................. G06F 9/44; G06F 9/45
[52] U.S. Cl. ........................................ 395/706; 395/676
[58] Field of Search .................................... 395/650, 700

[56] References Cited

U.S. PATENT DOCUMENTS 5,136,717  8/1992  Marley et al. .......................... 395/800
5,193,202  3/1993  Jackson et al. ......................... 395/800

OTHER PUBLICATIONS

Jerry L. Potter, The Massively Parallel Processor, pp. 230–260, 1986, MIT Press, Cambridge, Massachusetts.
Connection Machine$^R$ Model CM–2 Technical Summary, Version 5.1, May 1989, Thinking Machines Corporation, 245 First Street, Cambridge, Massachusetts.
MasPar Data–Parallel Programming Languages, 1990, MasPar Computer Corporation, 749 North Mary Avenue, Sunnyvale, California.

Architecture of a SIMD Massively Parallel Processor, Jonathan Harris, Oct. 10, 1990.

*Primary Examiner*—Thomas M. Heckler
*Assistant Examiner*—Dennis M. Butler
*Attorney, Agent, or Firm*—Diane C. Drozenski; Denis G. Maloney; Arthur W. Fisher

[57] ABSTRACT

A language construct that allows a software programmer to use an intermediate or high-level language command to explicitly group operations or fuse loops in a group of statements operating on parallel arrays is disclosed. The command instructs a compiler, which would otherwise add temporary variables to avoid data dependencies or perform data dependency analysis, to translate the enclosed statements directly into machine language code without adding those temporary variables and without performing any data dependency analysis. Execution of the command results in the performance of the group of statements by all of the virtual processors.

6 Claims, 4 Drawing Sheets

PARALLEL PROCESSING SYSTEM FOR VIRTUAL PROCESSOR IMPLEMENTATION OF MACHINE-LANGUAGE INSTRUCTIONS

This application is a continuation, of application Ser. No. 08/396,355, filed Feb. 28, 1995 now abandoned, which is a continutation of application Ser. No. 08/288,646 filed Aug. 10, 1994 which is a continuation of Ser. No. 07/722,072 filed on Jun. 27, 1991 now abandoned, entitled A PARALLEL PROCESSING SYSTEM FOR VIRTUAL PROCESSOR IMPLEMENTATION OF MACHINE-LANGUAGE INSTRUCTIONS.

BACKGROUND OF THE INVENTION

A. Field of the Invention

The present invention relates to the management of virtual processors, and more specifically to a system which allows programmers to use an intermediate or high-level language construct to externally manage the parallel processing on physical and virtual processors.

B. Description of the Related Prior Art

When performing an operation or series of operations on an array, especially one containing a large number of data elements, it is typically much faster to perform an operation on every cell of the array simultaneously, than to perform the operation on each cell in serial order. A computer having this capability is called a parallel processor. One type of parallel processor, a SIMD machine (single instruction stream, multiple data stream), consists of multiple physical processors coordinated by a common parallel processing control unit which fetches instructions and, if appropriate, broadcasts them to the multiple processors. "Massively parallel" machines may have tens of thousands of processors. The parallel processor may be ancillary to a host processor having a central processing unit (CPU) and a memory. In a typical arrangement, each physical processor has its own main memory and hardware register set.

Desirably each physical processor corresponds with one cell in each array and operates exclusively on the data in that cell. However, if the size of an array exceeds the number of physical processors, some or all of the physical processors will be assigned more than one cell. Those processors may be treated as comprising virtual processors, each of which corresponds with a single array cell. Thus, when the size of the array is equal to or less than the number of physical processors, the machine can operate in true parallel mode, i.e. operations on each physical processor occur simultaneously. However, when virtual processors are used, the machine actually operates in pseudo-parallel mode, wherein the physical processors operate simultaneously, but the virtual processors within a physical processor operate serially.

A compiler for parallel processing encodes a high-level statement into a format recognizable by the common control unit. Specifically, it translates a statement into a sequence of machine language instructions, wherein each instruction represents one or more microcode words which process the operation codes and the operands of the machine language instructions. An operation code specifies an operation to be performed, e.g. ADD or LOAD, and the operands specify the locations of the data upon which the operation should be performed, i.e. registers or memory locations.

At runtime, the instructions are loaded into an instruction memory. The controller reads an instruction from the instruction memory, decodes the instruction into its component operations or "nanoinstructions"and then broadcasts the "nanoinstructions" to the physical processors. The physical processors execute the nanoinstructions in parallel. When the instruction is completed the controller proceeds with the next instruction from the instruction memory.

When the size of an array is such as to require virtual processors, an instruction will be contained in an iterative loop that ensures that each operation is performed by all virtual processors in each of the physical processors. The loop will perform the operations within its body until all of the virtual processors have performed the enclosed operations. For example, the compiler may generate machine code that would act in accordance with the following loop:

For all virtual processors,
    C=A+B;

This loop will iterate through the virtual processors on each physical processor and thus perform the statement sequentially on each of the virtual processors. Each execution of the statements within a loop is called an iteration of that loop. Once the statement has been performed on every virtual processor, the loop terminates.

However, when virtual processors are employed, a compiler's translation of high-level code into machine language can be complicated by dependencies which are inherent in some high-level statements. A dependency exists when a statement uses data produced by another statement or when a statement overwrites data written by another statement.

A compiler which automatically maps high-level statements to loops for virtual processing performs dependency analysis so that its translation from high-level statements to machine instructions for the parallel system maintains the semantics of the program. Thus, the parallel system produces the same result as a sequential system.

Various types of dependencies exist, such as data flow dependencies, anti-dependencies, and output-dependencies. A data flow dependency occurs when data written by a statement, S1, is later retrieved by a statement, S2, in the serial execution of the program. A compiler translates the statements so that data is written by S1 before it is retrieved by S2. An anti-dependency occurs when data retrieved by a statement, S1, is later written by a statement S2, in the serial execution of the program. A compiler translates the statements so that the data is not retrieved by S1 after it is written by S2. An output-dependency occurs when data written by a statement, S1, is later written by a statement, S2, in the serial execution of the program. A compiler translates the statements so that the data is not written by S1 after it is written by S2. In the above dependencies, S1 and S2 may be the same statement. The translation of a statement by a compiler is valid if it does not violate any dependencies, such as those described above.

For example, consider the statement
    A(2,N+1)=A(1,N)+B(1,N);
where A and B are one dimensional arrays. In this statement the content of each cell in A is to be added to the contents of the corresponding cell in B and the result is stored in the next cell of A. The corresponding loop would operate as follows:

for all virtual processors,
    a(i+1,j+1)=a(i,j)+b(i,j),
where $a(i,j)$ and $b(i,j)$ are subsets of arrays A and B, respectively, processed during the current virtual processor iteration. In this example, the number of physical processors equals j−i+1.

The sequential iteration through this loop by virtual processors can cause corruption of the data unless certain precautions are taken. Specifically, in this example, an element of A modified in loop iteration m, a(j+1), would cause an incorrect value to be used in loop iteration m+1, a(i). Thus, the result obtained in this case would be incorrect.

To avoid an invalid translation, a compiler may translate the above statement into a consecutive pair of loops and generate machine operations to accomplish the following:

for all virtual processors,
temporary_array(i,j)=A(i,j)+B(i,j),
for all virtual processors,
A(i+1,j+1)=temporary_array(i,j), First, each virtual processor adds its data element from A to its data element from B and stores the result in memory in a temporary location. Then, each virtual processor retrieves the values of the temporary variables from memory and assigns them to A.

Not every statement contains a data dependency. Software programmers can structure their code to minimize, if not eliminate, data dependencies. The introduction of a temporary variable during the translation of a statement that has no data dependencies needlessly increases the number of memory accesses performed during that instruction. Consider, for example, the statement "C=A+B", wherein no data dependencies exist. To avoid data dependency problems a compiler may generate instructions that operate in accordance with the following statements:

for all virtual processors,
temporary_array=A+B
for all virtual processors,
C=temporary_array However, since there are no data dependencies, it is preferable for each virtual processor to add its data element from A to its corresponding data element from B and store the result directly in the corresponding cell in C. This is equivalent to combining the two loops above into the loop:

for all virtual processors, C=A+B

The combining of loops into a smaller number of loops is called "loop fusion". Loop fusion reduces the number of memory accesses, because it eliminates the intermediate steps of writing to a memory location and then reading from that location.

A "naive" compiler may not have the capacity to determine whether or not data dependencies exist and therefore will operate in every case on the assumption that there is a data dependency; that is, it will always use a temporary variable to generate machine level code that performs one operation at a time on all the virtual processors. A more sophisticated compiler may perform dependency analysis to determine whether loops may be fused. However, this may involve an extensive search. To avoid this, a compiler might perform a rough boundary comparison to determine whether a data dependency exists. However, this may provide an indication that there is a data dependency when there really is none. Moreover, dependency analyses do not handle pointer or general communication operations and thus some loops may not be subject to such analysis.

Upon finding that a data dependency exists, a compiler may even search for possible transformations which, when applied, would permit fusion of the loops. For example, if A(2,N+1)=A(1,N)+B(1,N), were executed starting at the high ends of the arrays, working backward toward the lower subscripted elements, an element of A that was changed in loop iteration m would not be referenced by loop iteration m+1 and the results would be correct. However, this basically requires the compiler to have a built-in expert system. While a programmer may be able to determine quickly whether fusion can be used, a compiler will be limited by its search strategy and the extensiveness of its search.

To avoid searching for a possible translation, some compilers allow the programmer to specify assertions which enable or disable dependency analysis, or provide dependence information. However, the programmer is limited to assertions recognized by the compiler.

Loop fusion is desirable not only within a statement but also sometimes between statements, particularly when the result of a statement is an operand in the subsequent statement. For example, consider the following sequence of statements:

C=A+B;
E=D*C;

Neither of these statements has any troublesome data dependencies. Unaware that there are no data dependencies, a compiler may generate machine code that operates in accordance with the following statements:

for all virtual processors, temporary_array=A+B;
for all virtual processors, C=temporary_array;
for all virtual processors, temporary_array=D*C;
for all virtual processors, E=temporary_array;

Sequentially, for all virtual processors, a cell of A will be added to a cell of B and stored as a temporary variable in memory. Then, for all virtual processors, the temporary variable is retrieved from memory and stored in the array C. Then, for all virtual processors, a cell of D is multiplied by a cell of C and stored as a temporary variable. Finally, for all virtual processors, the temporary variable is retrieved from memory and stored in the array E.

To minimize the number of memory accesses and thus increase efficiency it would be preferable to combine the loops above so that the two statements were executed as a group on each of the virtual processors. Fusion of the loops would result in each virtual processor adding its value for a cell in A to its value for a cell in B and storing the result in array C, while also retaining the value of the result in a hardware register. Then it would multiply its value for a cell in D by the value for a cell in C retained in the register and store the result in array E. Thus, the fusion of loops and the resulting grouping of operations, produces fewer memory accesses and, consequentially, faster operation. Moreover, the execution of fewer loops decreases loop overhead.

To group operations or fuse loops a programmer may program operations in assembly language and specify the individual operations. However, this requires the programmer to know the data structure in memory, i.e. the mapping of arrays to locations in the computer memory. This materially complicates the writing of software, particularly since a compiler may store arrays in any of a number of possible different configurations.

DESCRIPTION OF THE INVENTION

A. Summary of the Invention

The invention is a language construct in a high-level compiler that allows a software programmer to explicitly fuse loops and group operations and thereby reduce the number of memory accesses performed during execution of a statement or group of statements. This language construct instructs a compiler, which would otherwise add temporary variables to program statements, to translate the statements directly without adding those temporary variables. This permits the programmer to write efficient code in an intermediate or highlevel language without being concerned with the manner in which the compiler structures the data in memory. It also provides the benefits of loop fusion without the expense of a highly sophisticated compiler.

More specifically, the invention permits the programmer to specify one or more statements whose component operations form a single group which is executed by each virtual processor which has data for that group of operations. If the statements comprise more than one operation, then during a single loop through all of the virtual processors, each virtual processor performs a group of operations, rather than just a single operation. For each physical processor, the command results in the execution of the group of operations once for each virtualprocessor associated with it.

The invention can be embodied in a command that is added to the syntax of a language and to the compiler for that language, or it can be embodied in a subroutine in a library of routines. It may be preferable for it to be a command in the language syntax, because as such it is interpreted by the compiler as having access to variables which are local to the enclosing subroutine and module, without explicitly passing those variables to the command. This avoids data copies and will in some cases enhance compiler optimization.

In a subroutine, access to variables in the calling routine is explicitly provided by the programmer, i.e. either the variable is declared global so that routines outside the local scope will have access to it or it is explicitly passed as a parameter to the subroutine.

As an example of the operation of the invention, consider the following statement sequence:

C=A+B;
E=D*C;

Using the invention, a programmer can explicitly instruct the compiler not to add temporary variables and, thus, to generate machine code in accordance with the following statement:

for all virtual processors,
  begin;
    C=A+B;
    E=D*C;
  end;

During each iteration of the loop, each physical processor executes the statements on one virtual processor. Since the physical processors run in parallel, but the virtual processors within each physical processor operate sequentially, the controller broadcasts the operations as a group to each physical processor once for each virtual processor on that physical processor. Thus, if a physical processor has two virtual processors with data for the statements, two iterations through the loop are needed, so that during each iteration one virtual processor on each physical processor performs the group of statements.

In this example, the controller first instructs each physical processor to perform the group of statements on the first virtual processor in its memory. Then the controller instructs each physical processor to perform the group of statements on the second virtual processor in its memory. Thus, every first virtual processor on a physical processor performs the operations during the first iteration and every second virtual processor on a physical processor performs the operations during the second iteration.

Thus, for the example above, the invention will result in the following operations, depending on the hardware configuration. The first virtual processor on each physical processor loads its value for a cell in A into a register and loads its value for a cell in B into another register. The two registers are added and the result is placed in a register and also in the array C. The value for a cell in D is then loaded into a register and multiplied by the value for a cell in C, still contained in a register. The result is then stored in the array E. Thus, by using the invention, a programmer can explicitly group operations and fuse loops to minimize the number of memory accesses and thereby increase runtime efficiency.

The invention provides a programmer with a mechanism for externally specifying the iteration over virtual processors without attending to the details of how the data is configured in memory by the compiler. This is particularly beneficial because the compiler's structuring of data in memory may take any number of possible forms and may change over time. Moreover, there may be a number of different ways to iterate over the virtual processors, but one may be more efficient than the others. The programmer handles loop fusion and grouping of operations explicitly and therefore can write more efficient code than with a simple high level compiler. The loop fusion and grouping of operations causes instructions for data access by a single virtual processor to be closer together in the instruction stream. The compiler may then use standard sequential techniques to optimize the use of registers, i.e. fast memory, to take advantage of the loop fusions.

Moreover, the invention increases register "lifetimes" because the registers are used more efficiently, because the contents of a register may be accessed by subsequent operations before the contents are changed. Additionally, compiling time may be reduced, because the compiler resources are not spent searching for possible transformations for loop fusion or for dependence analysis.

B. BRIEF DESCRIPTION OF THE DRAWINGS

The foregoing discussion will be understood more readily from the following detailed description of the invention, when taken in conjunction with the accompanying drawings, in which.

C. DETAILED DESCRIPTION OF THE INVENTION

The following is a description of a data processing system having a parallel processing subsystem. It should be understood that the particular hardware configuration discussed herein is for illustration only, and is not a limitation on the applicability of the invention. Moreover, the electrical circuitry has been simplified for illustration purposes.

Figure 1:
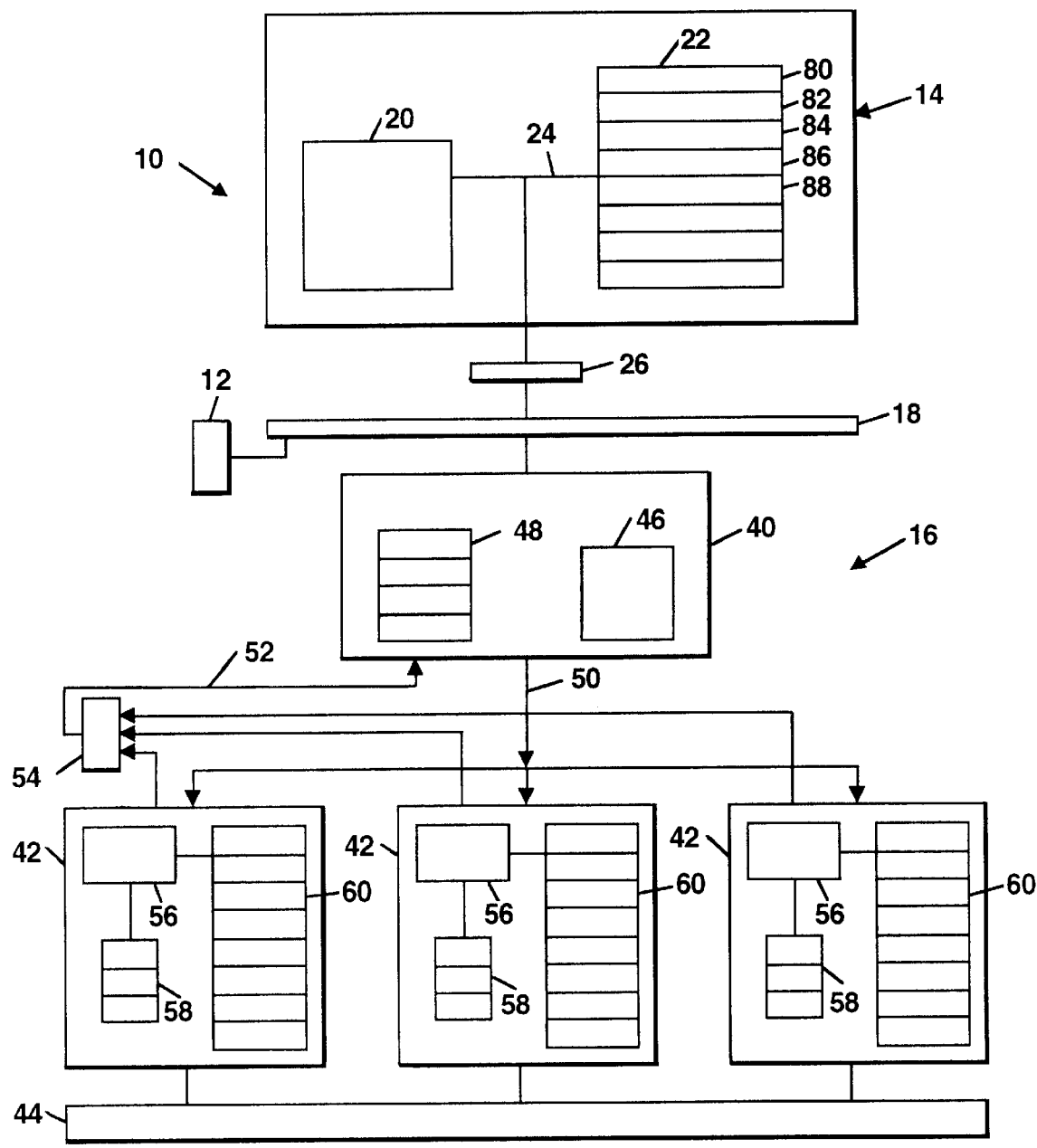
FIG. 1 depicts the configuration of a data processing system having parallel processing subsystem.

FIG. 1 is a block diagram of a parallel processing system 10. The system includes one or more user terminals 12, a host processor 14 and an ancillary parallel processor 16, interconnected by an I/O bus 18. The host processor 14 has a central processing unit (CPU) 20 and a memory 22. A system bus 24 interconnects the CPU 20, the memory 22 and an I/O adapter 26, connected to the I/O bus 18. The host processor 14 may, for example, be a Digital Equipment Corporation VAX 9000 or VAX 6000 series (with XMI buses).

The parallel processor 16 includes a control unit 40, multiple physical processors 42 and a router 44. The control unit 40 is connected to the I/O bus 18 and includes a sequencer 46 and a memory 48. The control unit is connected to the physical processors 42 by an instruction bus 50 and a global result bus 52. Data sent by the physical processors 42 to the control unit 40 is combined in a logic unit 54, for transmission over the global result bus 52.

Each physical processor 42 contains an arithmetic logic unit (ALU) 56, multiple hardware registers 58, and a memory 60. The data processors 42 can exchange information through the router 44.

Before a program can be executed, it must be translated into an executable format. First, the program is compiled by a compiler 80 which resides in the memory 22 of the host processor 14. The compiler 80 translates the program into machine code 82 which is also stored in the memory 22. The machine code 82 is then passed through a linker 84, if necessary, to link it with other machine code 86 necessary for its execution. The linker 84 thus converts the machine code into an executable program 88 which is also contained in the memory 22.

Upon receiving a command to execute the program 88, the CPU 20 retrieves the program from the memory 22 and copies it into the memory 48 of the control unit 40. As the control unit 40 reads each instruction from its memory 48, the sequencer 46 in the control unit decodes the instruction to produce a series of single-cycle machine operations or "nanoinstructions" and broadcasts them, if appropriate, over the instruction bus 50 to the physical processors 42. The physical processors, in turn, apply these instructions to data elements contained in their respective memories 60. Depending on the instruction, each of the physical processors 42 may send result information to the control unit 40. Each physical processor 42 provides one output datum. These data are combined by the logic unit 54 and the result is delivered to the control unit 40 on the global result bus 52.

Figure 2:
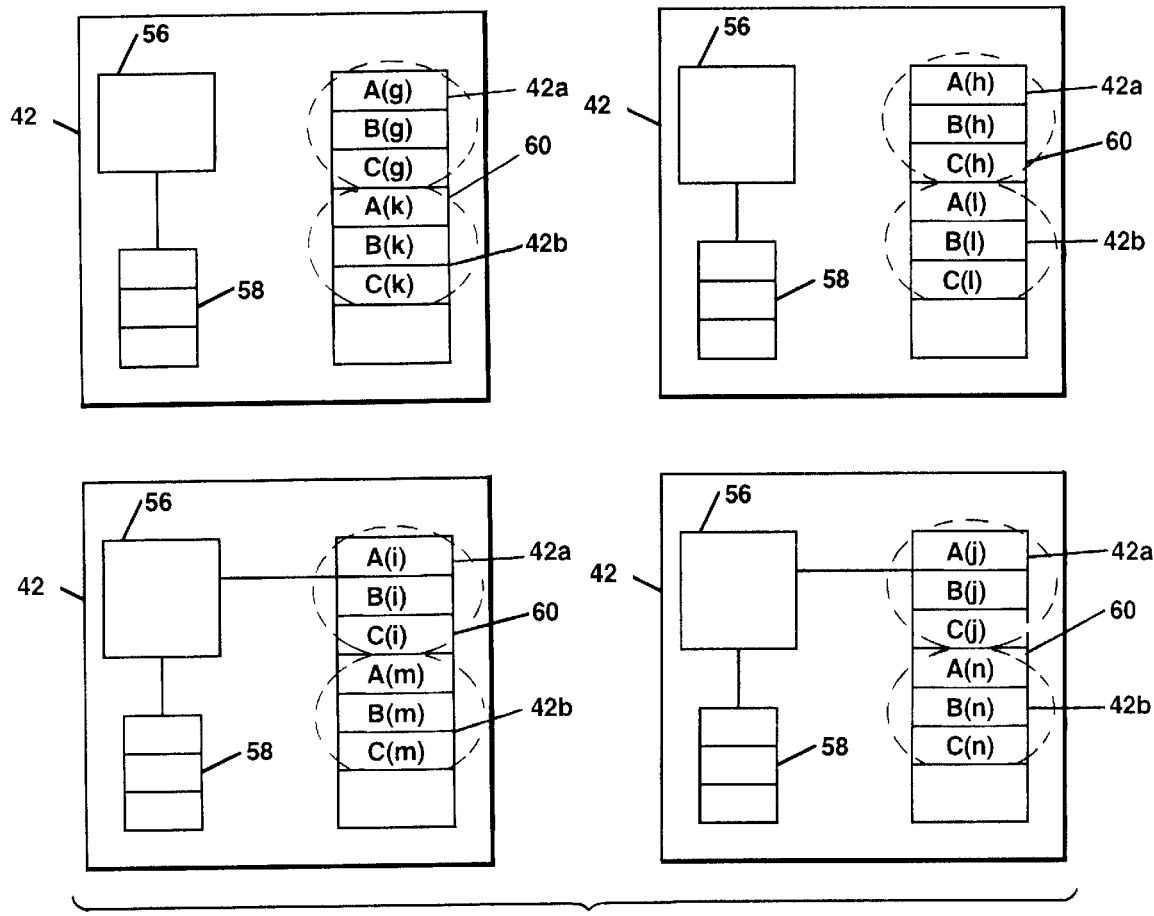
FIG. 2 depicts the organization of data in a memory in the system of FIG. 1.

FIG. 2 illustrates the storage of an array of data in the physical processors' memories 60. If the number of physical processors is equal to or greater than the number of cells in the array, the content of each cell of the array is stored in a separate memory 60 and processed by a separate processor 42. However, if the number of cells in the array exceeds the number of physical processors, virtual processors are established within the physical processors 42, so that the data in each cell is processed by a separate virtual processor. The virtual processor are pictorially represented in FIG. 2 by dashed circle 42*a* and 42*b*. In this example, there are twice as many cells in each array as there are physical processors 42. Thus, each physical processor must process the data in two cells of each array. Each physical processor 42 thus "contains" two virtual processors.

To accomplish this, each of the memories 60 is logically partitioned to hold the contents of two cells in each array. For example, when a physical processor operates on the data in cells A(i), B(i), and C(i) of arrays A, B and C, it is a virtual processor (i). Similarly, when a physical processor operates on the data in cells A(j), B(j), C(j), it is a virtual processor (j). Note that virtual processors which process data in cells g, h, i, and j of each array operate upon data located at the same memory offset within their respective physical processors and that the same holds true for virtual processors which process data in cells k, l, m, and n of each array. The invention does not depend on any particular data configuration.

Figure 3:
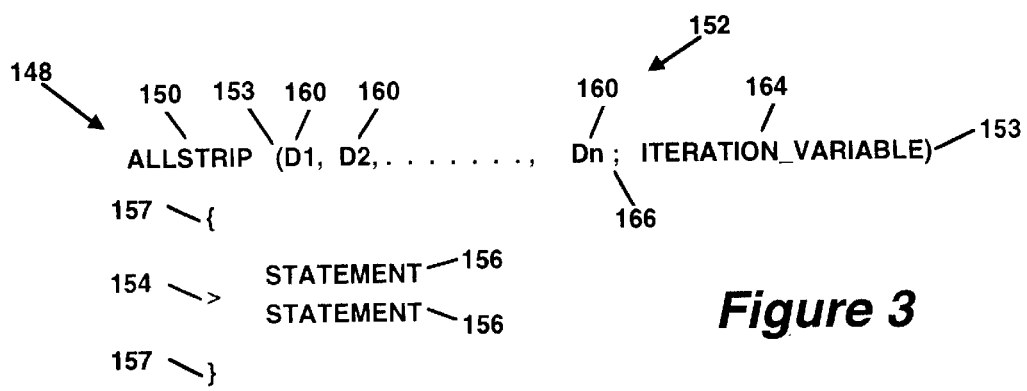
FIG. 3 illustrates a language construct embodying the invention.

FIG. 3 illustrates the preferred form of a high-level command 148 for the invention, as applied to a C or C-like language and compiler used for writing and executing programs for Digital Equipment Corporation's massively parallel "DEC/MPP" processor. The "DEC/MPP" is described in the following references: Robert Grondalski, "A VLSI Chip Set for a Massively Parallel Processor," Proc. 1987 IEEE International Solid State Circuits Conference, Vol. 30, pp. 198–199, 399–400 (1987); and Jonathan Harris, "Architecture of a SIMD Massively Parallel Processor," 1990. The command 148 consists of a command name 150, arguments 152 and a group 154 of one or more statements 156.

The command name "allstrip" is used herein. However, the actual command name 150 used is, of course, not essential to the invention. The arguments 152 are enclosed by parentheses 153 and consist of a list of one or more "dope" vectors 160 separated by commas 162, followed by an iteration variable 164. A semicolon 166 delineates the list of dope vector from the iteration variable 164. The statement group 154 consists of one or more program statements 156 enclosed in brackets 157.

Each dope vector 160 specifies an array as set forth below. The iteration variable 164 identifies the virtual processor within a physical processor operating during a current iteration. The iteration variable 164 is optional and may be omitted by the programmer. Preferably, if the iteration variable 164 is omitted, the semicolon 166 is omitted as well. The statements 156 are statements in the C or C-like programming language.

Figure 4:
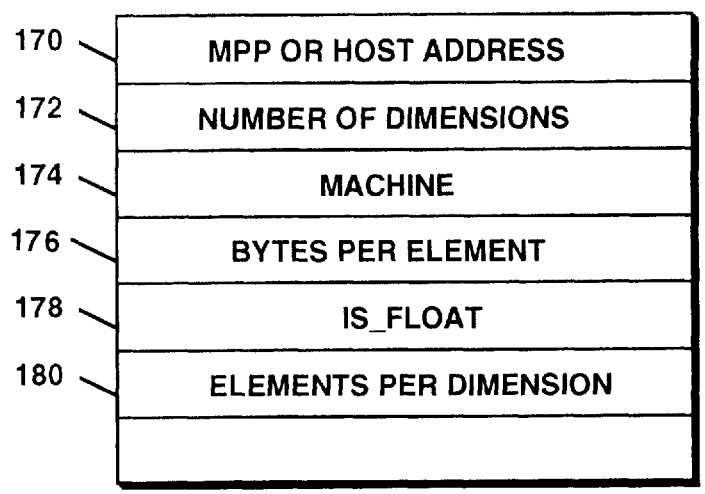
FIG. 4 depicts a possible format for a dope vector used in conjunction with the construct of FIG. 3.

The dope vector 160 is a data structure containing various characteristics of each array. The actual form of this vector depends on the compiler. FIG. 4 illustrates a possible form. The dope vector 160 includes the following fields: address 170, number_of_dimensions 172, on_mpp 174, bytes_per_element 176, is_float 178, and extent_t 180. The address field 170 contains the memory base address for the memory 22 or the memory 60 where the array is stored. The number_of_dimensions field 172 specifies the number of dimensions in the array. The on_mpp field 174 specifies whether the array is located in the host processor 14 or physical array processors 42. This is used to keep track of and verify the array's location, since the array may migrate between the sequential and parallel portions of the computing system. The bytes_per_element field 176 specifies the size, in number of bytes, of each data element in the array. The is_float field 178 specifies the data type, e.g. floating point or integer. The bytes_per_element field 176 and the is_float field 178 guide interpretation of the memory contents. Information in the dope vector 160 is used to compute the number of iterations needed for all virtual processors to process the group 154 of statements 156.

Using command 148, a programmer can specify a group 154 of one or more statements 156 to be executed as a group by each of the virtual processors. The command 148 instructs a compiler which would otherwise add temporary variables to directly translate the group 154 of statements 156 without adding those temporary variables or performing an analysis of data dependency. Thus, the compiler translates the exact form of the statements 156 specified by the programmer into machine language.

For example, a compiler directly translates a group of statements:
C=B+A,
E=D*C,
into machine language code which instructs all of the virtual processors to load the value for a cell in A into a register, load the value for a cell in B into a register, add them and place the result into a register and into the array C. Then, the code instructs them to load the value for a cell in D and multiply it by the value for a cell in C, still in a register, and store the result in array E.

Appendix 1 contains an example of code, in the C programming language, that may be added to a compiler written in the C language to implement an allstrip command 148. This code will vary somewhat according to the specific compiler, but any adaptations which might be required are within the compass of a person familiar with the compiler.

Figure 5:
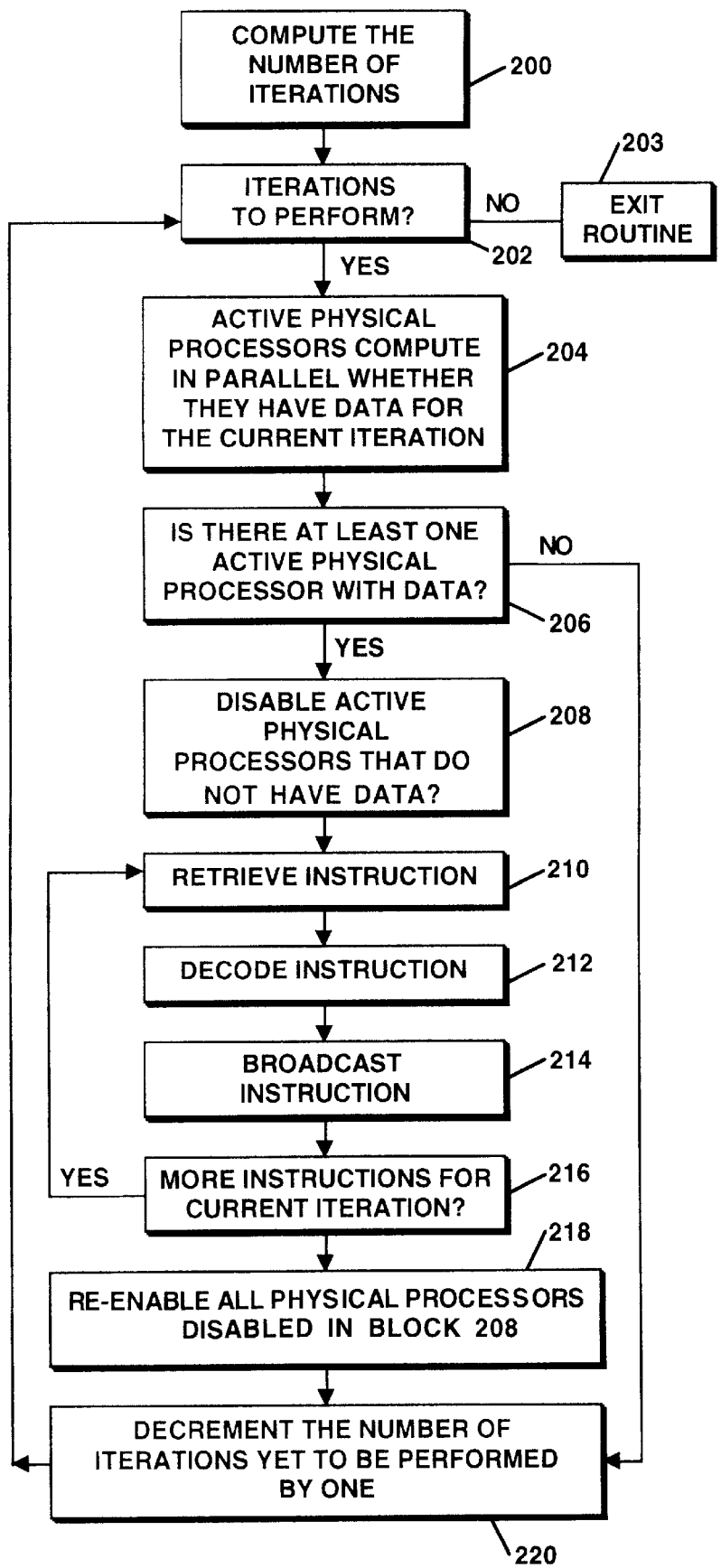
FIG. 5 a flow chart of the operations performed during execution of the invention.

More specifically, in response to an allstrip command 148, a compiler generates machine language code which results in the performance of a series of operations as shown in the flow chart in FIG. 5. As an example, command 148 may be as follows:

```
allstrip (A, B, C)
{
    C=A+B;
    E=C-A;
}
``` where A, B, and C are dope vectors describing arrays having one dimension of size N and in which each data element is an unsigned integer. In this example, N equals twice the number of physical processors on the system.

The control unit 40 (FIG. 1) determines the number of iterations through the physical processors it will have to make in order for each physical processor to perform the given group of statements on all virtual processors associated with it at block 200. This is accomplished using standard techniques known in the art. The number of iterations is assigned to the iteration variable 164 (FIG. 3).

In our example in FIG. 2, each physical processor has two virtual processors. Each iteration under the command 148 executes the group 154 of statements 156 on one virtual processor within each physical processor 42. Therefore, two iterations are needed to perform the group of statements on each of the two virtual processors within each physical processor 42.

The control unit 40 then checks whether there are more iterations to perform at block 202. If there are no further iterations to perform, the execution of the command 148 is completed at block 203 and the control unit 40 executes the main program by retrieving the next instruction, if any, from memory 48.

Whenever there are loop iterations to perform, the control unit 40 broadcasts an instruction to the active physical processors 42 to determine whether they have data for the current iteration at block 204. In our example, the number of physical processors along each axis of the physical grid divides evenly into the number of the data elements in the array, so for each iteration each physical processor has data. However, if the size of dimension 0 in arrays A, B, and C were N+1, a third iteration would be necessary to process the (N+1)th element. During this third iteration, only one virtual processor would have data to be processed. Thus, only that physical processor would be active to perform the group of operations during the third iteration, i.e. would have data for that iteration; the other physical processors would be inactive.

The method used to determine whether a physical processor has a virtual processor with data for an iteration is not important to the invention. The physical processors 42 send messages over the global result bus 52 to the control unit 40 indicating which physical processors have data. When a physical processor does not have a virtual processor with data for an iteration, it is inactive during that iteration at block 208. That is, the physical processor does not execute the instructions on the instruction bus 50.

For each iteration the control unit 40 checks to make sure that at least one active physical processor 42 has data for the current iteration at block 206. This test can be eliminated if all of the physical processors 42 are active upon entry to the allstrip command 148 and if minimal storage is used. If there is not any active physical processor with data, then the control unit decrements the number of iterations to perform by one at block 220 and proceeds to the next iteration, if any, at block 202.

If there is a physical processor with data, the control unit 40 essentially broadcasts the instructions corresponding to the group 145 of statements 156 to the physical processors with data. To do this, the control unit 40 retrieves an instruction from memory 48 at block 210, decodes it at block 214, and broadcasts the decoded instruction over the instruction bus 50 at block 214 to the physical processors 42 which have data for the current iteration. The control unit 40 repeats this process for each instruction corresponding to the group 145 of statements 156.

If there are no more instructions to perform in the current iteration as determined at block 216, the control unit 40 reactivates any inactive physical processors 42 at block 218 which were inactivated at block 208. The control unit 40 then decrements the number of iterations to be processed by 1 at block 220 to indicate that it has completed another iteration. The control unit 40 repeats the above described process beginning at block 202.

There are various methods for iterating through cells of an array. The actual method is not integral to the invention as long as the group 154 of statements 156 is performed on all of the virtual processors.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a computer system that includes a plurality of physical processors and a control unit for supplying the physical processors with nanoinstructions for data processing operations on arrays of data, each of said arrays including a plurality of cells, and virtual processors being established within the physical processors for each cell of the array exceeding an amount of said physical processors, a parallel processing system comprising:

means for specifying at least one program statement as forming a group of said data processing operations, wherein said croup of said data processing operations do not employ dependency-introduced temporary variables;

means for converting said program statement to a group of machine-language instructions;

means for specifying the data upon which said group of machine-language instructions are performed; and means for performing iterative cycles through all virtual processors on each physical processor and, during each iteration executing the group of said machine-language instructions one after another without dependency-introduced temporary result storage during the iteration.

2. A parallel processing system, as defined in claim 1, in which said performing means, in response to program statements not specified as forming a group of said data processing operations, inserts dependency-introduced temporary variables.

3. The parallel processing system, as defined in claim 1, in which said means for performing executes said group of said machine-language instructions through the execution on said physical processors of nanoinstructions decoded from said machine-language instructions.

4. In a computer system that includes a plurality of physical processors and a control unit for supplying the physical processors with nanoinstructions for data processing operations on arrays of data, each of said arrays including a plurality of cells, a virtual processor within a physical processor being established for each cell of the array exceeding an amount of said physical processors, a method of parallel processing comprising the steps of:

performing a compilation of a program statement specified as not requiring dependency-introduced temporary variables, said compilation providing a sequence of machine language instructions for control of said virtual processors; and executing said sequence on said virtual processors through the execution on said physical processors of nanoinstructions decoded from said machine-language instructions.

5. The method of parallel processing, as defined in claim 4, wherein the step of providing a sequence of machine-language instructions for control of said virtual processors further comprises the step of generating said sequence of machine-language instructions for looping through the virtual processors on the physical processors in said sequence.

6. In a computer system that includes a plurality of physical processors for executing nanoinstructions for data processing operations on arrays of data, each of said arrays including a plurality of cells, a method of parallel processing for executing a group of machine-language instructions by establishing virtual processors within said physical processors for each of said cells when an amount of said cells exceeds an amount of said physical processors, and performing a compilation of a program statement specified to the compiler as forming said grout of machine-language instructions which do not employ dependency-introduced temporary variables comprising the steps of:

decoding said machine-language instructions into said nanoinstructions;

supplying said nanoinstructions to said physical processors; and executing said machine-language instructions by said virtual processors by performing iterative cycles through all the virtual processors on each physical processor and during the iteration executing said nanoinstructions one after another without dependency-introduced temporary result storage.

* * * * *